United States Patent [19]

Tanaka et al.

[11] 4,309,726

[45] Jan. 5, 1982

[54] MUTING CIRCUIT IN A PCM RECORDING AND REPRODUCING APPARATUS

[75] Inventors: Hiromichi Tanaka, Yokohama; Takashi Hoshino, Fujisawa; Takao Arai, Yokohama, all of Japan

[73] Assignee: Hitachi, Ltd., Tokyo, Japan

[21] Appl. No.: 154,023

[22] Filed: May 28, 1980

[30] Foreign Application Priority Data

May 28, 1979 [JP] Japan ................................ 54-65034
Apr. 2, 1980 [JP] Japan ................................ 55-42025

[51] Int. Cl.³ ............................................. G11B 5/00
[52] U.S. Cl. ................................................... 360/32
[58] Field of Search ....................... 360/32, 40, 24, 38

[56] References Cited

U.S. PATENT DOCUMENTS 4,146,099  3/1979  Matushime et al. ................. 360/32
4,227,221 10/1980  Kanazawa ............................ 360/32
4,234,896 11/1980  Onishi et al. ........................ 360/32

*Primary Examiner*—Vincent P. Canney
*Attorney, Agent, or Firm*—Craig and Antonelli

[57] ABSTRACT

Digital data units representative of analog audio signal are constructed into a data unit sequence with an error detection code being added to each of the data units for detecting coding errors within the data unit, and data synchronizing signals are inserted one for every predetermined interval of the data unit sequence to constitute a PCM data sequence, which is recorded and reproduced. The number of times of coding errors detected within the data unit by the error detection code during the time period between one data synchronizing signal and the next following data synchronizing signal is monitored and when the number exceeds a first predetermined count, the audio output is muted, and when the number decreases below a second predetermined count which is much smaller than the first predetermined count, the muting mode of the audio output is released to prevent the noise output.

6 Claims, 10 Drawing Figures

MUTING CIRCUIT IN A PCM RECORDING AND REPRODUCING APPARATUS

BACKGROUND OF THE INVENTION

1. Field of the Invention

The present invention relates to a PCM recording and reproducing apparatus wherein an analog audio signal is converted to digital data for recording it on a record medium and digital data reproduced from the record medium is reconverted to the original analog audio signal, and more particularly to a muting circuit for muting noise output produced by dropouts due to defects of the record medium or failure or loss of data synchronizing signal.

2. Description of the Prior Art

Defects of record medium such as magnetic tape are unavoidable due to deposition of fine dusts on the medium or damage of the medium during its manufacture or usage, and phenomenon called dropout is encountered. If even a bit of digital data is erroneously coded or decoded due to the dropout, the data is varied to an unexpected value and the reproduced sound includes a large clicking noise.

A known method for overcoming the noise problem is to provide, in addition to the digital data representative of the analog audio signal, an error correction code for correcting error when errors are included in the digital data and a cyclic redundancy check code (hereinafter referred to as CRC) for detecting the errors so that the errors in the digital data are detected by the CRC and the correct data is restored by the error correction dode to prevent the noise.

This method is effective to a small dropout. In the PCM recording the reproducing apparatus, however, a considerably long dropout may occur resulting in the error or loss of a number of data bits. In such a case, the error correction code cannot correct the errors in the data and consequently noise may be produced.

On the other hand, as to synchronizing signals, horizontal/vertical synchronizing signals and synchronizing signal in the PCM recording the reproducing apparatus are locked in a PLL (phase locked loop) circuit. As a result, the locking is unlocked when a power supply is turned on or by the dropout, and the synchronizing signals are lost to cause discontinuity of data. This discontinuity of data and the resulting erroneous correction of data may also produce noise. This is remarkable when data synchronizing signal is lost continuously.

When a VTR tape is used as a record medium in the PCM recording and reproducing apparatus and a VTR magnetic tape having picture image signal recorded thereon is erroneously loaded to a VTR, big noise will be produced because the picture image data is treated as the PCM audio data. When such a big noise is inputted, it is difficult to reproduce correct data because it is beyond the correction ability of the error correction code and the CRC.

SUMMARY OF THE INVENTION

It is an object of the present invention to provide a muting circuit which, when data error beyond the ability of the error correction code occurs, mutes audio output to prevent noise from being produced.

In accordance with the present invention, an error correction code for detecting coding error in digital data is added to each unit of the digital data representative of an analog audio signal, to construct a sequence of data units, and data synchronizing signals are inserted at a predetermined interval in the sequence of data units to construct a PCM data sequence. The number of times of detection of coding error by the error correction code in the data units between one data synchronizing signal and the next following synchronizing signal is monitored. When the number exceeds a first predetermined count, the audio output is muted to prevent noise from being produced, and when the number decreases below a second predetermined count which is much smaller than the first predetermined count, the muting of the audio output is released.

BRIEF DESCRIPTION OF THE DRAWINGS

FIGS. 1A and 1B show data arrangements, in which

DESCRIPTION OF THE PREFERRED EMBODIMENTS

Before describing the present invention, the format of the PCM signal will be first explained with reference to FIGS. 1A and 1B.

Figure 1A:
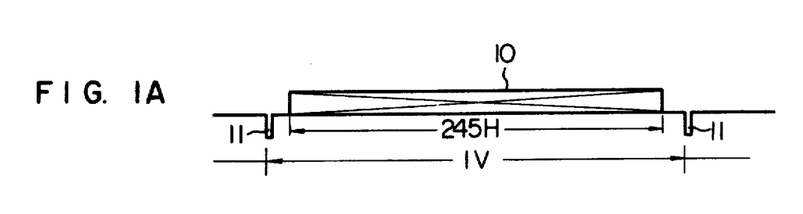
FIG. 1A shows a data arrangement in one vertical synchronizing period and FIG. 1B shows a data arrangement in one horizontal synchronizing period.
Figure 1B:
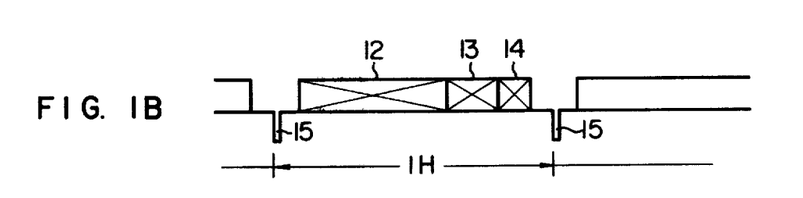

As shown in FIG. 1A, the format of the PCM signal is in accord with a standard television signal in for example, the NTSC system and a data block 10 is accommodated in 245 horizontal synchronizing periods (245 H) in one vertical synchronizing period (1 V = 262.5 H). As shown in FIG. 1B, each horizontal synchronizing period accommodates audio data 12 which is digital representation of an analog audio signal, an error correction code 13 for correcting errors in the data 12 and a CRC 14 for detecting the errors. Accordingly, one vertical synchronizing period (1 V) contains 245 sets of audio data 12, error correction code 13 and CRC 14. Numerals 11 and 15 denote vertical synchronizing signals and horizontal synchronizing signals, respectively. Those synchronizing signals are also used as the synchronizing signals for the data sequence.

Referring now to FIGS. 2 through 9, the preferred embodiments of the present invention will be explained.

Figure 2:
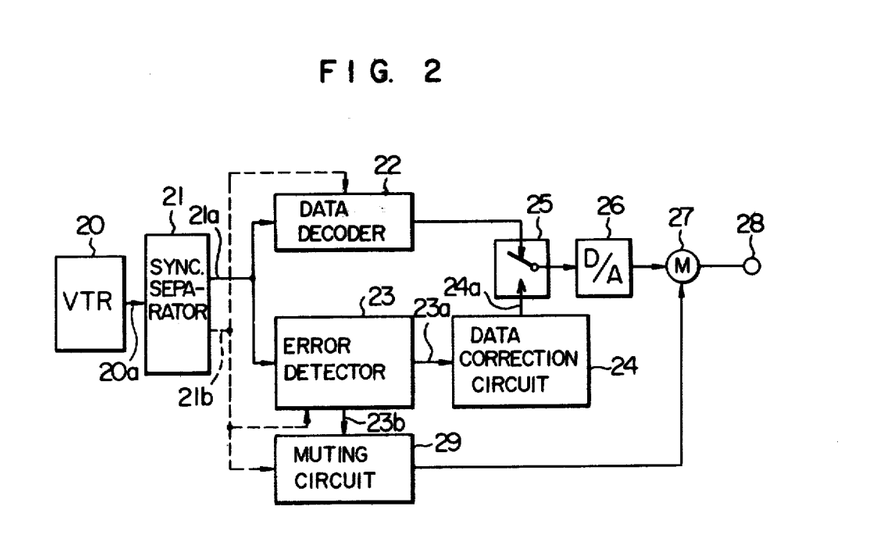
FIG. 2 shows a block diagram of a first embodiment of a reproducing unit of a PCM recording and reproducing apparatus including a muting circuit in accordance with the present invention.

FIG. 2 shows a block diagram of one embodiment of a reproducing unit of a PCM recording and reproducing apparatus including a muting circuit in accordance with the present invention. In FIG. 2, numeral 20 denotes a VTR and a reproduced signal 20a therefrom is applied to a separation circuit 21 which separates the synchronizing signals from data signals. A data signal output 21a is applied to a data decoder 22 and an error detection circuit 23. An output from the data decoder 22 is supplied to a signal output terminal 28 through a switching circuit 25, a digital-to-analog (D/A) converter circuit 26 and a muting means 27 such as an electronic switch. On the other hand, a first output 23a from the error detection circuit 23 is supplied to the switching circuit 25 through a data correction circuit 24 while a second output 23b is supplied to the muting means 27 through a muting circuit 29. A synchronizing signal output 21b from the separation circuit 21 is supplied to the data decoder 22, the error detection circuit 23 and the muting circuit 29. The muting means 27 function to either pass the output of the D/A converter circuit 26 to the signal output terminal 28 or to block (e.g. ground) the output, under the control of the output of the muting circuit 29.

The operation of the circuit of FIG. 2 is now explained. Of the reproduced signals 20a from the VTR 20, the data signal output 21a derived from the separation circuit 21 is decoded by the data decoder 22, and if no error is included in the audio data 12, the output of the data decoder 22 is passed through the switching circuit 25 to the D/A converter circuit 26 where it is converted to an analog signal, which is outputted to the signal output terminal 28 through the muting means 27 which is now in off state. If the CRC 14 in the data signal sequence detects an error in the data signal output 21a applied to the error detection circuit 23, the data correction circuit 24 restores correct data 24a using the error correction code 13 and the correct data, instead of the incorrect data derived from the data decoder 22, is fed to the D/A converter circuit 26 through the switching circuit 25. At this time, the error detection circuit 23 informs to the muting circuit 29 that one error has been detected. The muting circuit 29 counts the number of times of detection of error with reference to the vertical synchronizing signal 11 in the synchronizing signal output 21b and controls the on and off states of the muting means 27 in accordance with the number.

Figure 3:
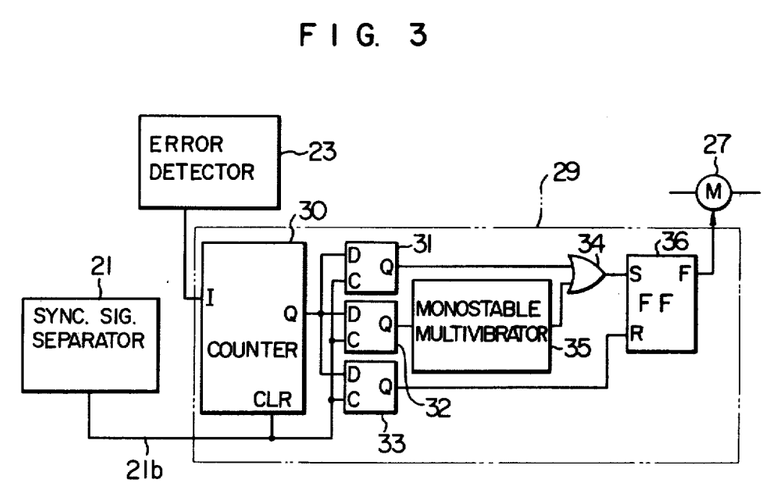
FIG. 3 shows a specific circuit diagram of the muting circuit shown in FIG. 2.

Referring to FIG. 3 which shows a specific circuit diagram of the muting circuit, relationship between the number of error signals supplied to the muting circuit 29 and the on-off control of the muting means 27 is explained. In FIG. 3, a block enclosed by a broken line is the muting circuit 29. Numeral 30 denotes a counter having an error signal counting input terminal I, a clear input terminal CLR and a count output terminal Q which is connected to terminals D of comparators 31, 32 and 33, respectively. The comparator 31 produces a high level output at an output terminal Q when an input to the terminal D is a count of 32 or higher and produces a low level output in other cases. The comparator 32 produces a high level output at an output terminal Q when an input to the terminal D is a count of 64 or higher and produces a low level output in other cases. The comparator 33 is a latched comparator having its output terminal Q latched at a high level when an input to the terminal D immediately before the triggering of the comparator 33 by an input to a terminal C is a count of 2 or lower and latched at a low level in other cases. The terminals C of the comparators 31, 32 and 33 receive the vertical synchronizing signals 11 derived from the separation circuit 21 so that they are cleared in synchronism with the vertical synchronizing signals.

An output from the terminal Q of the comparator 31 is applied to one input terminal of an OR circuit 34 and an output from the terminal Q of the comparator 32 is applied to the other input terminal of the OR circuit 34 through a monostable multivibrator 35 having a duration of T. The monostable multivibrator 35 starts (high output) at a high level edge and stops (low output) after duration of T, and restarts if another high level edge appears in the duration of T.

An output of the OR circuit 34 is applied to an input terminal S of a set-preference R-S flip-flop 36 and an output from the terminal Q of the comparator 33 is applied to an input terminal R of the R-S flip-flop 36. An output from a terminal F of the set-preference R-S flip-flop 36 is applied to the muting means 27 so that the muting means 27 is turned on by the high level output and turned off by the low level output.

Figure 4:
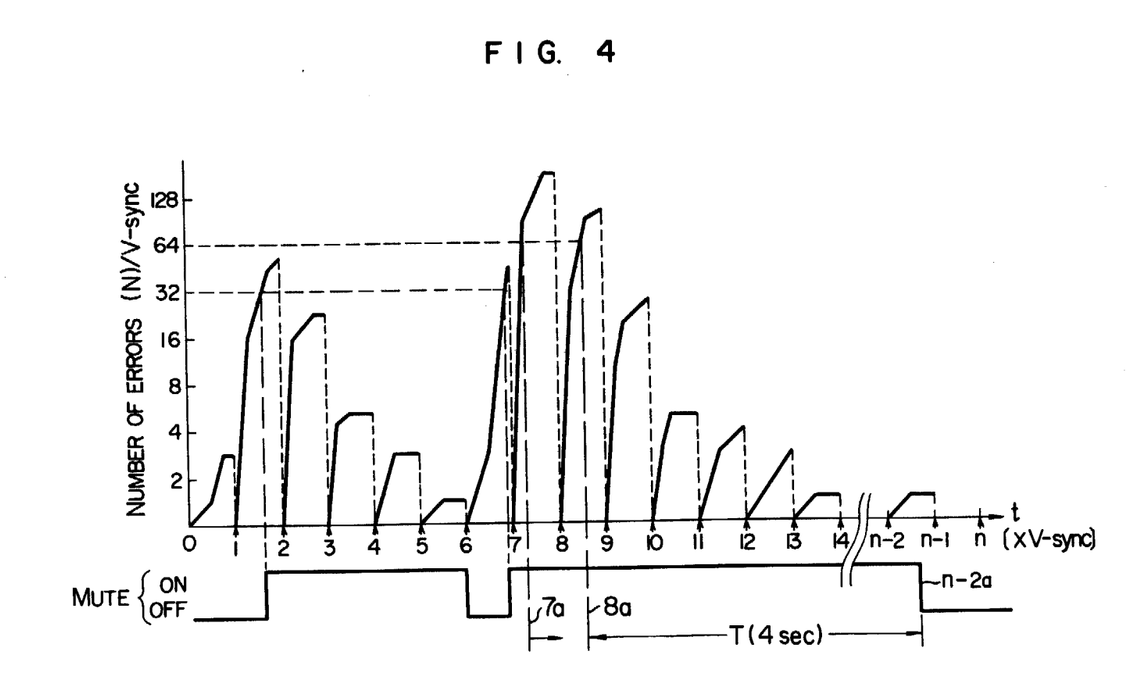
FIG. 4 is a graph illustrating the occurrence of CRC errors per vertical synchronizing period.

Referring now to FIG. 4, the operation of the circuit of FIG. 3 is explained. In FIG. 4, an ordinate represents the number of CRC errors per vertical synchronizing period and abscissa represents vertical synchronizing unit time t. The bottom line shows on-off state of the muting means.

First, let us assume that the muting means 27 is in its off state (output F of the R-S flip-flop 36 is low) and total of three CRC errors were detected during a time period of $t=0$ to $t=1$. At the time point of $t=1$, the number N (=3) of errors is cleared. At this time, since N is equal to 3, the output Q of the comparator 31 is at low level, and the outputs of the comparators 32 and 33 are also at low level. Accordingly, the output F of the R-S flip-flop 36 is maintained at low level because both inputs thereto are at low level. When the number N of errors exceeds 32 during a time period of $t=1$ to $t=2$, the output Q of the comparator 31 is latched to high level, which is conveyed through the OR circuit 34 to the input terminal S of the R-S flip-flop 36. As a result, the output F of the flip-flop 36 assumes a high level to turn on the muting means 27. During a time period of $t=2$ to $t=5$, the outputs Q of the comparators 31 and 32 remain at low level while the comparator 33 latches the low level each time the vertical synchronizing signal is applied because the number N of errors is not less than two. Accordingly, the input to the R-S flip-flop 36 is at low level and the output F remains at high level (and the muting means 27 remains on-state). At the time point of $t=6$, the number of errors is less than two and the output Q of the comparator 33 assumes the high level which causes the input R of the R-S flip-flop 36 to assume the high level. As a result, the output F of the flip-flop 36 flips to the low level. Accordingly, the muting means 27 is turned off.

Secondly, during a time period of $t=6$ to $t=7$, when the number N of errors exceeds 32, the muting means 27 is turned on in the same manner as described above. When the number N of errors exceeds 64 at a time point of $t=7a$, the output Q of the comparator 32 assumes the high level and the monostable multivibrator 35 starts. Since the number N of errors again exceeds 64 at a time point 8a, the monostable multivibrator 35 restarts. After a time point of $t=9$, the outputs of the comparators 31 and 32 are at low level but the output of the monostable multivibrator 35 remains at high level for the time period of T. This causes the succeeding stage R-S flip-flop 36 to be set through the OR circuit 34 to maintain the on-state of the muting means 27. If the number N of errors decreases below two at a time point of $t=14$ within the time period of T (e.g. approximately 4 seconds), the comparator 33 produces the high level output to reset the R-S flip-flop 36. However, since the R-S flip-flop 36 is of set-preference type, it is not reset until a time point of $t = n - 2a$ at the end of the time period of T, when the flip-flop 36 turns off the muting means 27.

The first part of the operation described above is applicable to the muting operation which is applied to short term dropout or externally disturbing noise during steady reproducing operation. It has a hysteresis of on-muting when the number N of errors is 32 or higher and off-muting when N is two or lower. The second part of the operation is applicable to the muting operation for the preset time period of T when the data synchronizing signal is materially shifted.

Figure 5:
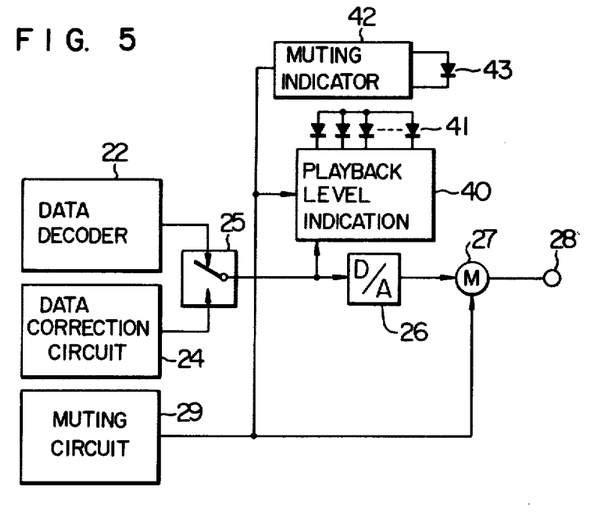
FIG. 5 shows a block diagram in which a muting indication circuit has been added to the block diagram shown in FIG. 2.

FIG. 5 shows a circuit diagram which is responsive to the turn-on of the muting means to erase the playback level indication and activate the muting indicator. In FIG. 5, the data signal derived from the data decoder 22 or the data correction circuit 24 through the switching circuit 25 is applied to the D/A converter circuit 26 and a playback level indication circuit 40 including a group of LED's for indicating the playback level. The output of the muting circuit 29 is applied to the muting means 27, the playback level indication circuit 40 and a muting indicator 42 including an LED 43. Like in FIG. 2, the muting means 27 for producing the reproduced output signal is displaced between the D/A converter circuit 26 and the signal output terminal 28, and the playback level indication circuit 40 decodes the signal before it is applied to the D/A converter circuit 26 for digital display. The output of the muting circuit 29 is used to drive the muting means 27 to mute the reproduced output signal while it also controls the playback level indication circuit 40 to extinguish the indication. It also controls the muting indicator 42 to inform to a user the occurrence of muting during playback and distinguish the muting mode from zero signal playback.

Figure 6:
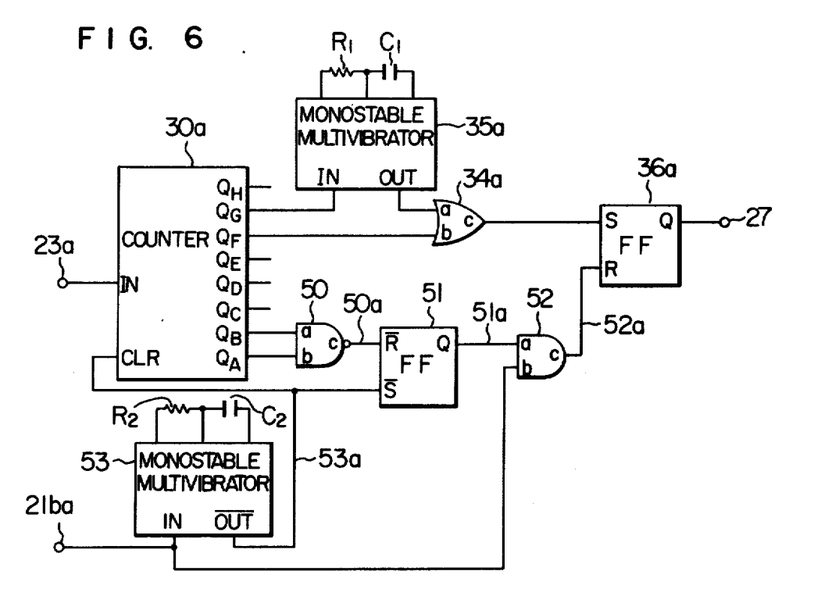
FIG. 6 shows a more detailed circuit diagram of the muting circuit shown in FIG. 3.
Figure 7:
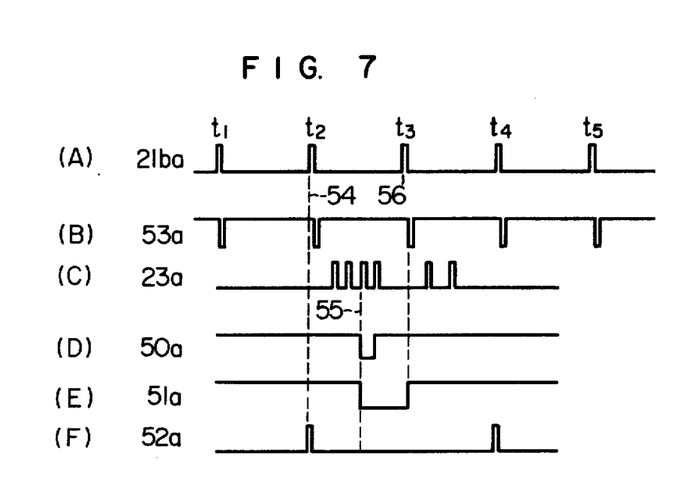
FIG. 7 shows waveforms in the operation of the circuit shown in FIG. 6.

FIG. 6 shows a detailed circuit diagram of the muting circuit 29 shown in FIG. 3, and FIG. 7 shows waveforms in the operation of the muting circuit. In FIG. 6, numeral 30a denotes an 8-bit binary counter having an input terminal 1N, a clear terminal CLR and output terminals $Q_A$ to $Q_H$ with terminal $Q_A$ being the least significant bit terminal and terminal $Q_H$ being the most significant bit terminal. A low level input to the terminal CLR causes all output terminals $Q_A$ to $Q_H$ to assume "0". The output terminal $Q_G$ of the counter 30a is connected to an input terminal 1N of a monostable multivibrator 35a which produces a pulse having a duration determined by a resistor R1 and a capacitor C1 and starts in response to an edge changing from a low level to a high level. An output terminal OUT of the monostable multivibrator 35a is connected to an input terminal a of an OR circuit 34a having its input terminal b connected to the output terminal $Q_F$ of the counter 30a. An output terminal c of the OR circuit 34a is connected to an input terminal S of a set-preference R-S flip-flop 36a, an output terminal Q of which is applied to the muting means 27. The output terminals $Q_A$ and $Q_B$ of the counter 30a are connected to input terminals b and a, respectively, of a NAND circuit 50, an output terminal c of which is connected to an input terminal R of an S-R flip-flop 51. An input terminal a of an AND circuit 52 is connected to an output terminal Q of the S-R flip-flop 51 and an input terminal b is connected to a vertical synchronizing signal terminal 21ba, and an output terminal c is connected to an input terminal R of the R-S flip-flop 36a. A monostable multivibrator 53 has an input terminal 1N connected to the vertical synchronizing signal terminal 21ba and starts in response to an edge changing from a high level to a low level to produce a pulse having a duration determined by a resistor R2 and a capacitor C2 at an output terminal OUT, which is connected to the input terminal CLR of the counter 30a and the input terminal S of the S-R flip-flop 51.

The operation of the circuit of FIG. 6 is now explained. As shown in FIG. 7(A), the vertical synchronizing signal applied to the input terminal 1N of the monostable multivibrator 53 from the terminal 21ba is a positive pulse sequence having a fixed frequency. The output signal 53a from the monostable multivibrator 53 is a pulse sequence started at a negative edge of the vertical synchronizing signal 21ba, as shown in FIG. 7(B). As shown in FIG. 7(C), when the input signal 23a (number of errors) to the counter 30a is zero during the time period of $t_1$ to $t_2$ shown in FIG. 7(A), the outputs $Q_A$ and $Q_B$ of the counter 30a are both "0" at the time point 54 so that the output 50a of the NAND circuit 50 assumes a high level as shown in FIG. 7(D). Since the output signal 53a of the monostable multivibrator 53 is also at high level as shown in FIG. 7(B), the output 51a of the S-R flip-flop 51 remains high level as shown in FIG. 7(E). At this time (time point 54), when a high level signal is applied to the terminal b of the AND circuit 52 from the terminal 21ba, the output 52a of the AND circuit 52 assumes high level for the period of the signal as shown in FIG. 7(F) to reset the R-S flip-flop 36a. As a result, the muting output signal assumes low level (or it remains low level if the R-S flip-flop 36a has previously been reset).

In the time period of $t_2$ to $t_3$ shown in FIG. 7(A), if three pulses are applied to the input terminal 1N of the counter 30a, the binary outputs $Q_A$ and $Q_B$ of the counter 30a both assume high level at the time point 55 so that the output signal 50a of the NAND circuit 50 assumes low level. As a result, the output signal 51a of the S-R flip-flop 51 assumes low level to latch the output. At the time point 56, even if the positive pulse of the vertical synchronizing signal 21ba is applied to the AND circuit 52, the R-S flip-flop 36a is not reset. The output signal 51a of the S-R flip-flop 51 is set (to high level) by the output signal 53a of the monostable multivibrator 53 which is applied following to the vertical synchronizing signal 21ba. Thus far, the operation of the circuit portion shown in FIG. 6 which corresponds to the comparator 33 and the R-S flip-flop 36 shown in FIG. 3 has been described.

If the number of counter input signals 23a reaches 32 during the period of the vertical synchronizing signal 21ba, the output $Q_F$ of the counter 30a which is the sixth digit output assumes high level to set the R-S flip-flop 36a through the OR circuit 34a so that the output of the R-S flip-flop 36a assumes high level, which in turn causes the muting means to be turned on.

If the number of input signals 23a to the counter 30a reaches 64, the output $Q_G$ of the counter 30a which is the seventh digit output assumes high level to trigger the monostable multivibrator 35a which renders its output terminal OUT high level for a fixed time period so that the R-S flip-flop 36a is set through the OR circuit 34a to produce high level output. Since the R-S flip-flop 36a is of set-preference type as described above, it causes the muting output to assume high level irrespective of the reset input. Thus far, the operation of the portion of FIG. 7 which corresponds to the comparators 31 and 32, the monostable multivibrator 35, the OR circuit 34 and the R-S flip-flop circit 36 shown in FIG. 3 has been described.

While the number N of errors was set to 32 or 64 in the embodiment described above, the number may be arbitrarily selected.

Figure 8:
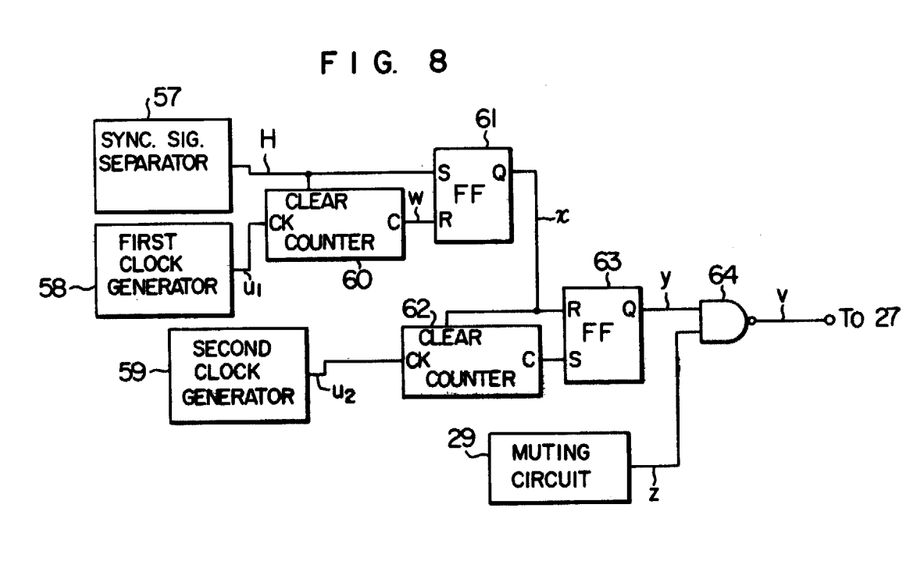
FIG. 8 shows a block diagram of a second embodiment of the muting circuit of the present invention.

In the embodiment described above, the CRC error detection signal is used as the detection signal for noise factor for inhibiting the noise output. In a similar manner, the continuous loss of the horizontal synchronizing signals may be detected. Referring now to FIG. 8 which shows a circuit diagram of another embodiment and FIG. 9 which shows a time chart, a muting circuit is described which controls the muting operation in response to the detection of the continuous loss of the horizontal synchronizing signals.

In FIG. 8, numeral 57 denotes a separation circuit for separating the horizontal synchronizing signals from the PCM data sequence, and numerals 58 and 59 denote first and second clock pulse generating means, respectively. Symbols H, $u_1$ and $u_2$ denote signal lines for the horizontal synchrnozing signals, the first clock pulses and the second clock pulses, respectively. Numeral 60 denotes a scale-of-N counter for counting the first clock pulses $u_1$. It is cleared each time the horizontal synchronizing signal H normally appears, and produces an output w when a predetermined number of continuous horizontal synchrnozing signals H are lost. The number N of the scale-of-N counter 60 is selected to satisfy the relation $3 f_n/f_H < N < 4 f_n/f_H$, where $f_n$ is a repetition frequency of the clock pulses $u_1$ applied to the input of the scale-of-N counter 60, $f_H$ is a repetition frequency of the horizontal synchronizing signals H, and it is assumed that the number of horizontal synchronizing signals H continuously lost, on which the muting operation is based is equal to four. Numeral 61 denotes an R-S flip-flop having a set input receiving the horizontal synchronizing signal H and a reset input receiving the output w of the scale-of-N counter 60.

Figure 9:
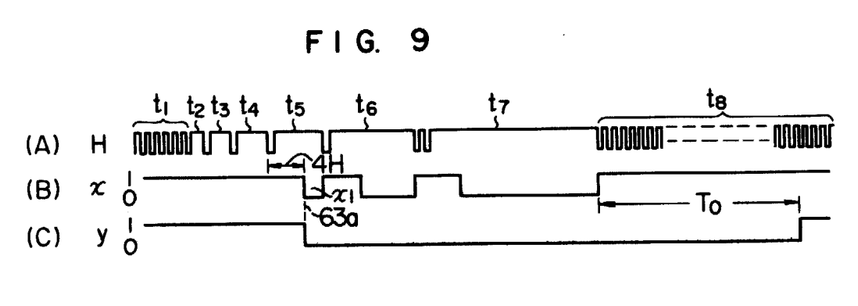
FIG. 9 shows waveforms in the operation of the circuit shown in FIG. 8.

The operation of the scale-of-N counter 60 and the R-S flip-flop 61 is now explained with reference to FIG. 9.

FIG. 9(A) shows an output waveform of the horizontal synchrnozing signals H. During the time period $t_1$ where the horizontal synchronizing signal H is not lost, the scale-of-N counter 60 is cleared (reset) by the respective signals H so that no output w is produced.

During the time period $t_2$ where one signal H is lost, the counter 60 is cleared by the next incoming signal H so that no counter output w is produced. Similarly, during the time periods $t_3$ and $t_4$ where two and three signals H are lost, respectively, no counter output w is produced because the scale-of-N counter 60 is cleared before it counts up N clock pulses $u_1$. During the time period $t_5$ where four signals H are lost, the reset signal H does not appear before the counter 60 counts up the predetermined count N and the counter 60 produces the output w when it counts up N clock pulses $u_1$. The counter output w of the scale-of-N counter 60 resets the R-S flip-flop 61, which is again set by the next incoming horizontal synchronizing signal H. Accordingly, the output x of the R-S flip-flop 61 changes from a high level ("1") to a low level ("0") and from the low level to the high level, as shown in FIG. 9(B).

A scale-of-M counter 62 and an R-S flip-flop 63 in the succeeding stage will now be explained.

The scale-of-M counter 62 functions to establish a release time period for muting after the normal horizontal synchronizing signal H has been restored. The release time period may be one second, as an example. The number M of the scale-of-M counter 62 is set to be equal to $f_m$ which is a repetition frequency of the clock pulses $u_2$ applied to the scale-of-M counter 62.

Referring again to FIG. 9, during the time period $t_5$ where four horizontal synchronizing signals are lost, the R-S flip-flop 63 is reset by the output x of the R-S flip-flop 61. Accordingly, an output y of the R-S flip-flop 63 changes from the high level ("1") to the low level ("0") at the time point 63a as shown in FIG. 9(C) so that the muting is activated during the low level period.

The output x of the R-S flip-flop 61 (low level period in FIG. 9(B)) causes the muting signal (low level in FIG. 9(C)) to be produced by the R-S flip-flop 63 and clears the scale-of-M counter 62. When the output x changes to the high level, the scale-of-M counter 62 counts up the clock pulses $u_2$, but the content of the scale-of-M counter 62 is cleared by each output x from the R-S flip-flop 61 which indicates that four or more continuous horizontal synchronizing signals H are lost, as shown in the time periods $t_6$ and $t_7$. In the time period $t_8$ where four or more continuous horizontal synchronizing signals H are not lost, the scale-of-M counter 62 counts up 60 clock pulses $u_2$ in the time period $T_o$, when it produces a muting release signal from an output terminal C. This causes the output y of the R-S flip-flop 63 to be switched from the low level to the high level and release the muting one second after four or more continuous horizontal synchronizing signals H are no longer lost.

In order to assure that the muting is activated when four or more horizontal synchronizing signals H are lost and the muting is released one second after four or more horizontal synchronizing signals H are no longer lost, the repetition frequency $f_n$ of the clock pulses $u_1$ to the scale-of-N counter 60 is set to 2.6 MHz, the repetition frequency $f_m$ of the clock pulses $u_2$ to the scale-of-M counter 62 is set to 59.9 Hz, the number N is set to 756 and the number M is set to 60. In this case, a relation of $f_n = 168 f_H$ is met, and the number N=756 corresponds to 4.5 H.

In the embodiment shown in FIG. 8, the CRC signal monitor circuit (muting circuit 29) as shown in FIG. 3 is provided in parallel with the horizontal synchronizing system monitoring system, and the outputs of both circuits are applied to a NAND gate 64. Accordingly, the muting signal y produced by monitoring the horizontal synchronizing signals H and the muting signal z produced by monitoring the CRC signal are combined in the NAND gate 64 so that the muting is activated when either one of the monitoring circuits satisfies the given requirement.

In the above explanation, the number N of the scale-of-N counter 60 is set to 756 and the number M of the scale-of-M counter 62 is set to 60. By appropriately selecting those numbers, the number of horizontal synchronizing signals continuously lost at which the muting is activated and the period to the release of the muting can be determined.

As described in detail hereinabove, according to the present invention, the noise output which would otherwise be produced by the short-term dropout or external noises or the loss of synchronizing signals during the reproduction is muted. Furthermore, the period of muting mode can be automatically determined depending on the causes of noises. More particularly, for the single-shot tape dropout or external noise, the muting mode is released in response to the detection that the number of CRC errors has reduced below a predetermined number, and when a long-term noise is expected to occur by the loss of the synchronizing signal, the muting mode is continued for the variable preset time period.

Furthermore, the above operation is attained by monitoring the continuous loss of the horizontal synchronizing signal and the system can smoothly restore to the normal operation mode.

We claim:

1. In a PCM recording and reproducing apparatus wherein digital data units representative of an analog audio signal are constructed into a data unit sequence with an error detection code being added to each of said data units for detecting coding errors within at least each of said data units, and data synchronizing signals are inserted one for every predetermined interval of said data unit sequence to constitute a PCM data sequence, said PCM data sequence being recorded on a record medium and reproduced from said record medium, and said data units are retrieved from said reproduced PCM data sequence and the retrieved data units are converted to an analog signal to reproduce the original analog audio signal;

a muting circuit comprising;
(a) error detection means for detecting coding errors in said data unit by said error detection code and producing an eror detection signal each time said coding error is detected;
(b) separation means for separating said data synchronizing signals from said PCM data sequence;
(c) count means for counting up said error detection signals, said counting means being cleared by said synchronizing signals;
(d) first control means for producing a first control signal when the count of said count means reaches a first predetermined count;
(e) second count means for producing a second control signal when the count of said count means immediately before cleared by said data synchronizing signal is equal to a second predetermined count smaller than said first predetermined count;
(f) third control means adapted to receive said first and second control signals for continuously producing a muting signal when said first control signal is received and blocking said muting signal when said second control signal is received; and
(g) muting means inserted in an analog audio signal path of a reproducing unit for interrupting the transmission of the analog audio signal in response to said muting signal.

2. A muting circuit in accordance with claim 1 further comprising;
an OR circuit connected between said first control means and said third control means having one input terminal thereof connected to receive said first control signal;
fourth control means for producing a third control signal when the count of said count means reaches said second predetermined count; and
a timer circuit being triggered by said third control signal for producing a fourth control signal, said fourth control signal being applied to the other input terminal of said OR circuit for a predetermined time period;
said third control means being adapted to receive the output of said OR circuit in preference to said second control signal to produce said muting signal while said output of said OR circuit is being applied to said third control means.

3. A muting circuit in accordance with claim 2 wherein said timer circuit is adapted to be retriggered when said third control signal is applied after said fourth control signal has been produced.

4. A muting circuit according to claim 1, 2 or 3 wherein said muting signal from said third control means is used to drive a muting indicator.

5. A muting circuit according to claim 1, 2 or 3 wherein said count means comprises a binary counter having a plurality of bit output terminals, a low order bit output of said binary counter being used as said second predetermined count in said second control means and one of high order bit outputs being used as said first predetermined count in said first control means.

6. In a PCM recording and reproducing apparatus wherein digital data units representative of an analog audio signal are constructed into a data unit sequence with an error detection codes and a data unit synchronizing signal being added to each of said data units for detecting coding errors within at least each of said data units, and data synchronizing signals are inserted one for every predetermined interval of said data unit sequence to constitute a PCM data sequence, said PCM data sequence being recorded on a record medium and reproduced from said record medium, and said data units are retrieved from said reproduced PCM data sequence and the retrieved data units are converted to an analog signal to reproduce the original analog audio signal;

a muting circuit comprising;
(a) separation means for separating said data unit synchronizing signals from said PCM data sequence;
(b) first monitor means adapted to receive said data unit synchronizing signals from said separation means for monitoring the presence or absence of said data unit synchronizing signal, said first monitor means producing a first detection signal when the loss of a predetermined number of continuous data unit synchronizing signals is detected;
(c) control means for producing a muting signal when said first detection signal is applied thereto and blocking said muting signal when a second detection signal is applied thereto;
(d) muting means inserted in an analog audio signal path in a reproducing unit for interrupting the transmission of the analog audio signal in response to said muting signal; and
(e) second monitor means for releasing said muting signal from said control means, said second monitor means monitoring the recovery of said data unit synchronizing signal after the production of said first detection signal by said first monitor means to produce said second detection signal a predetermined time after the detection of said recovery.

* * * * *